United States Patent [19]

Armitage, Jr. et al.

[11] 3,775,759

[45] Nov. 27, 1973

[54] MAGNETIC RECORDING AND READBACK SYSTEMS WITH RAISED COSINE EQUALIZATION

[75] Inventors: John D. Armitage, Jr.; Maxwell R. Cannon, both of Boulder, Colo.

[73] Assignee: International Business Machines Corporation, Armonk, N.Y.

[22] Filed: Jan. 21, 1972

[21] Appl. No.: 219,738

[52] U.S. Cl. .......................................... 340/174.1 H

[51] Int. Cl. .......................................... G11b 5/44

[58] Field of Search .............. 340/174.1 B, 174.1 H, 340/174.1 G

[56] References Cited

UNITED STATES PATENTS 3,215,995 11/1965 Sierra .............................. 340/174.1

3,408,640 10/1968 Masson ............................ 340/174.1

3,493,868 2/1970 Hackett, Jr. ....................... 305/321

3,590,164 2/1971 Krauss ............................. 179/15.5

OTHER PUBLICATIONS

"IEE Transactions on Electronic Computers" Vol. EC-16, No. 6, 12/67 (pages 732-743).

"Principles of Data Communications" by Lucky, Saltz & Weldon, McGraw Hill, 1968.

*Primary Examiner*—Vincent P. Canney

*Attorney*—Herbert F. Somermeyer et al.

[57] ABSTRACT

Detectability of readback signals from a digital signal magnetic recorder is enhanced by employing filtering techniques effecting raised cosine output signal characteristics. In a preferred form, the recording system is linearized, such as by applying an AC bias to the recording signal. Included are filtering actions having inverse sinc (noise whitening) and inverse channel characteristics. The digital detector for the recording system preferably operates on threshold or zero crossings and synchronizes its operation on the readback signal.

19 Claims, 5 Drawing Figures

MAGNETIC RECORDING AND READBACK SYSTEMS WITH RAISED COSINE EQUALIZATION

BACKGROUND OF THE INVENTION

The present invention relates to digital magnetic recording systems, particularly to techniques and methods for compensating for intersymbol interference and the adjustment of zero or threshold crossings for enhancing self-clock type detection of digital data.

Compensation schemes in magnetic recorders, sometimes referred to as equalization, have been used in various forms for many years. In the digital area, using "saturation" recording, prewrite compensation is quite common for adjusting zero crossovers. That is, digital information is represented by the phase of the signal readback from the recording system. Changes in the zero crossover are perturbations which distort the phase of the signals and particularly in self-clocked readback systems make recovery of the digital information more difficult.

Compensation and equalization have been used in linear systems as well as digital systems. For example, the RIAA prewrite compensation for audio systems is quite well known. Prewrite compensation is desirable because it may also enhance the signal-to-noise ratio.

In digital recording systems, it is necessary to limit the frequency bandwidth of the signals being processed. Such limiting introduces signal perturbations in readback signals making data recovery less reliable. Such perturbations often appear as phase shifts, i.e., a shift in time of occurrence of a zero crossover, peak, and the like. Such signal perturbations can be reduced by making the bandwidth of the recording system extremely wide, i.e., much wider than necessary for transmitting information therethrough. This is expensive and creates problems in that magnetic transducers have low-pass filter characteristics. Accordingly, it is desirable to make the bandwidth of digital magnetic recorders ideally as narrow as the Nyquist bandwidth or preferably not greater than twice a Nyquist bandwidth. However, when the bandwidth is severely limited, signal perturbations become more pronounced. Therefore, it is desirable that a recording system be employed having narrow bandwidth, but which nonetheless effectively compensates for severe perturbations introduced by such narrow bandwidth.

Certain analogies have been drawn between communication theory for classical communication systems and magnetic recording systems. Difficulty in applying the analogy in a straight-forward manner results from the fact that characteristics of operation of a communications system are quite different from that of a magnetic recording system. For example, magnetic recording systems have media usually driven by servo motors. It is well known that servo motors are subject to certain velocity variations. Such velocity variations may be ±10 percent of nominal media velocity yielding a 20 percent variation in frequency of the readback signal. Of course, the media velocity varies during recording as well; and, therefore, there may be a very substantial change in the frequency from the recording to the readback. These variations make many communication theory techniques difficult, if not impractical, to implement directly. It should be remembered that in most communication systems crystal-control oscillators maintain the frequency of operation, particularly of the carrier, to close tolerances. This is particularly true in narrow-band systems.

In digital systems, the fidelity of signal wave shape is only crucial as to selected characteristics and during selected sample times. For example, if the digital information is detected by detecting peaks, then the location and the amplitude of the peaks are the critical factors. On the other hand, if zero crossovers are used for representing digital information, then the location of the zero crossovers with respect to defined bit periods, i.e., the periodicity of the signal, is a crucial factor. The relationship of zero crossovers to peaks also may be of interest depending on how the digital information is to be represented in the magnetic recording system and the synchronization means to be employed.

It is desirable in most instances to increase the recording density on the media. This not only saves media, but reduces access time to the recorded information. Digital recording density is usually referred to as "flux reversals per inch" or "flux changes per inch" (fci). As the recording density increases, there are many unfortunate characteristics introduced into the system. For example, the shorter the wavelength, the more sensitive the readback signal amplitude is to the relationship of the media to the transducer. The phase shift and other perturbations mentioned above also become more acute.

SUMMARY OF THE INVENTION

It is an object of the present invention to provide a relatively narrow bandwidth digital recorder which is relatively insensitive to zero-crossing perturbations.

In accordance with one feature of the invention, the signal being processed between the recorder and the detector is adjusted to supply output signals having a raised cosine frequency characteristic. The adjustment is preferably associated with a linearized recording system. In another feature, filters yielding raised cosine output signal characteristics are distributed between recording and the readback for improving the signal-to-noise ratio in the system.

It is also a feature of the invention in conjunction with the preceding features that the bandpass characteristics of the recording system are preferably not greater than twice the Nyquist bandwidth.

The above features are most advantageously used in connection with a self-clocking zero-crossing detector for recovering digital information from the signal processed in the recording system.

The raised cosine filtering adjustment is coupled with an inverse sinc or signal whitening filter compensation, and with an inverse channel filter characteristic. The inverse channel filter is selected to complement selected signal perturbation characteristics of the recording channel. The phase characteristics of all the filtering actions are preferably linear with frequency, at least across the bandwidth used.

The above-described compensation is preferably supplied during a so-called "analog portion" of the signal-processing circuits. That is, no amplitude limiting is effected during the filtering action.

When the above features are applied to a magnetic recording system, ideally the signal output amplitude at one-half the zero-crossing width is equal to one-half of the peak amplitude. This amplitude to phase relationship enables an accurate clock signal to be readily derived from the waveform. That is, ISI (intersymbol interference) is eliminated whenever criterion is met and substantially reduced when such criterion is approximated.

The foregoing and other objects, features, and advantages of the invention will be more apparent from the following more particular description of the preferred embodiment of the invention as illustrated in the accompanying drawings.

THE DRAWINGS

GENERAL DESCRIPTION

Figure 1:
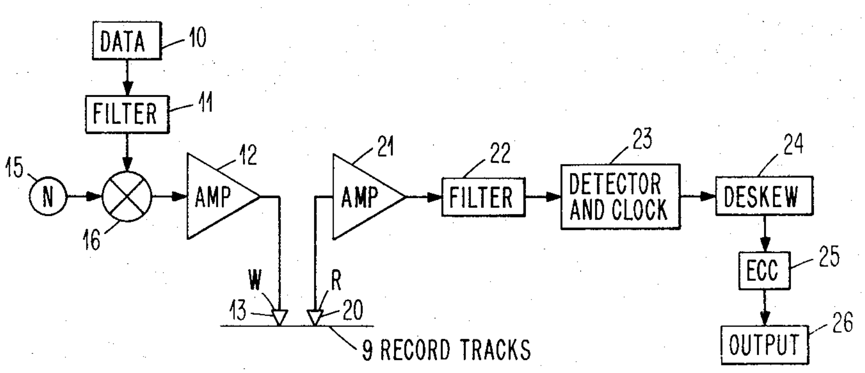
FIG. 1 is an abbreviated diagrammatic showing of a recording system which may use the present invention.

Data to be recorded in digital form is supplied by data source 10 through compensating filter 11. Filter 11 may be matched with the filter in the readback system for effecting desired channel filtering characteristics. Filter 11 supplies the compensated signal which may include low pass signal characteristics to linear mixer 16. Mixer 16 receives a bias signal from source 15 and linearly adds it to the signal to be recorded. Amplifier 12 takes the biased signal and records same on media 14 through write transducer 13. Without limitation, a preferred form of the invention, media 14 is one-half inch tape recorded in nine tracks, as is currently widely practiced in the data processing industry. Each track would have a separate data source, filter, amplifier, mixer, and write transducer.

For each track, a separate read head 20 senses the flux permutations in media 14 and supplies a readback signal through amplifier 21 to compensating filter 22. Filter 22 may provide all of the zero-crossing compensation (later more fully described), or may provide a portion thereof with the other portion being provided by filter 11 in the recording circuits. Filter 22 supplies the compensated signals to detector and clock 23. Detector 23 preferably recovers the digital information from the recording signal using zero-crossover detection. The clocking portion of detector 23 tracks the frequency and phase of the compensated signal. Such detectors and self-clocking characteristics are sufficiently well known not to warrant further discussion.

The detected information is asynchronously provided by detector 23 to deskewing apparatus 24. Deskewing apparatus 24 adjusts the time in the various record track signal channels to form bytes of data. The assembled bytes are checked by ECC circuit 25 for errors and possible error correction. Correct data is then supplied to output system 26 which may be a digital computer or the like.

Figure 2:
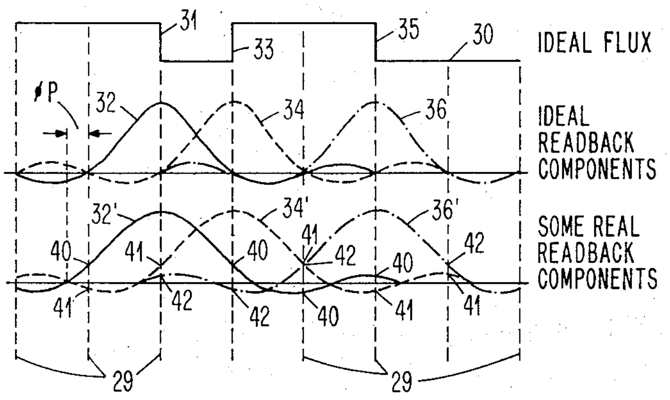
FIG. 2 is a set of idealized waveforms illustrating the effect of practicing the invention of the FIG. 1 illustrated system.

When the readback signal is adjusted to the ideal components of FIG. 2, a zero-axis cross detector easily generates a clocking signal from the precise and regular zero crossings. When such a detector operates from the phase-shifted readback signal, the time perturbations in zero-axis crossings make it difficult to generate a clocking signal. Such difficulty can unnecessarily limit the recording density of a recording system.

A NARROW BANDWIDTH DIGITAL RECORDER

The present invention enhances operation of the FIG. 1 illustrated digital recording system by enabling a narrow bandwidth recording system with up to fully compensated zero crossovers in the read-back signal. Referring to FIGS. 1 and 2, the idealized recorded flux 30 is applied to media 14 by write head 13. Bias from source 15 may be of such a frequency that it is not within the effective bandwidth of the read head and amplifier. Any recording scheme may be used. In any event, transitions 31, 33, and 35, plus the interrelationships thereof with respect to sampling times 29, represent the digital information in flux pattern 30. Using a conventional $d\phi/dt$ head 20, i.e., the head is responsive to a time change in flux (the transitions 31, 33, and 35), the ideal readback components in the time domain are shown respectively by waveforms 32, 34, and 36 for transitions 31, 33, and 35. The actual readback waveform at amplifier 21 is an arithmetic summation of the illustrated components. A characteristic of the readback signal in idealized form is that all zero crossings of all components are at the sampling times 29. Accordingly, there will be no intersymbol interference or phase shift of the idealized readback signal. With no such phase shift, detection can be reliably effected.

In a narrow bandwidth digital recording system not equalized to eliminate or reduce intersymbol interference, there is a tendency for the major lobes of the readback signals 32, 34, and 36 to be broadened as shown in the real readback component chart having waveforms 32', 34', and 36' corresponding to the idealized major lobes. Note that for signal component 32', it has amplitude 40 at the time-sampling times 29. This results from a zero-crossing phase shift $\phi P$. The other two signal components 34' and 36' are similarly broadened, each having an amplitude 41 and 42, respectively, at sampling times 29. Because of such phase shift of the zero-axis crossing, reliable detection of digital information from readback waveforms in narrow band recording systems is reduced. Also, the peaks of the signal components 32, 34, and 36 can also be shifted in time but are not shown as such because the present description is directed toward a zero-axis crossing, no limitation thereto with respect to practicing the present invention.

By practicing the present invention, as will be fully explained, the distorted readback signal is adjusted to approximate the idealized form. This adjustment is accomplished by applying raised cosine filtering to obtain a characteristic in the output signal for each data signal which was recorded. With such filtering, the bandwidth of the recording channel can be limited to be not greater than twice the Nyquist band; yet reliable readback is provided. Typically, to obtain the above-stated function, filtering action will include inverse sinc and inverse channel filtering plus a filtering action to obtain the raised cosine shaped output signal components. Further improvement is attained by linearizing the recording channel in combination with the above-mentioned filtering or equalization techniques.

The raised cosine signal characteristic is described in the book *Principles of Data Communications* by Lucky, Saltz, and Welden; McGraw Hill 1968, particularly on Pages 50 and 51. The raised cosine family of characteristics extends from $\alpha=0$ to $\alpha=1$ in accordance with FIG. 4.5 showing on Page 51. In applying the raised cosine filtering technique to a magnetic recording channel, a certain amount of pulse slimming is effected. However, the advantageous result attained by the raised cosine filtering technique is the adjustment of the zero-axis crossing of the main lobe and all of the secondary lobes as seen in FIG. 2. That is, the secondary lobes 32', 34', and 36' are all adjusted to be zero at the bit time boundaries 29. In this manner, there is no (or insubstantial) signal added to the zero-axis crossing of the main lobes; that is, no intersymbol interference. The amount of adjustment effected by raised cosine filtering techniques is somewhat dependent upon other factors in the recording channel, as will be next explained.

Figure 3:
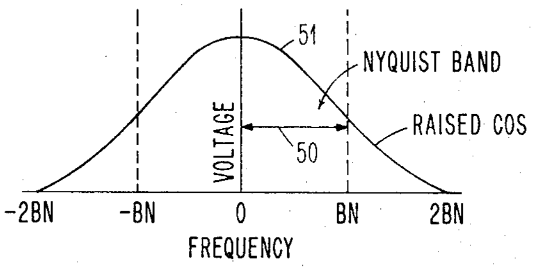
FIG. 3 is a graphical representation of the raised cosine characteristic with respect to a Nyquist bandwidth in the frequency domain.
Figure 4:
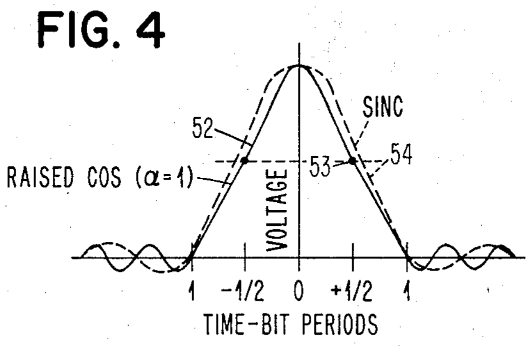
FIG. 4 is a graphical representation of a raised cosine characteristic with an inverse sinc characteristic in the time domain wherein time is represented in bit periods of the signals being processed.

The most-preferred form of the raised cosine filter is that family of raised cosine filters residing at or near $\alpha=1$ filters as shown in FIG. 3 of the present application and shown in FIG. 4.5 of *Principles of Data Communications*, supra.

In enhancing the magnetic recording system, linearizing the recording channel, such as by applying a bias signal to the signal to be recorded, makes the digital recorder performance more predictable. If a nonlinear recording system is used, obtaining raised cosine signal output characteristics in a given system is more difficult to analyze and predict. On the other hand, a linearized recording channel may be assumed for design purposes and the invention applied to a nonlinear recording channel with some advantageous results.

The effect of an inverse sinc filter action is to flatten the data-caused frequency spectrum of such data signal within the bandwidth of interest, i.e., twice Nyquist bandwidth. This is necessary to cause the compensated readback signal as supplied to detector 23 to closely resemble the idealized readback signal, i.e., the raised cosine configuration of a readback signal having zero-axis crossings of the main lobe and secondary lobes to be close to the time bit periods 29.

An inverse sinc filter satisfies the transfer function $\pi fT/\sin\pi fT$, wherein T is the nominal pulse repetitive period of the data signal. This actually represents the transfer function of a rectangular pulse in mathematical terms and tends to equalize, or flatten, the frequency response of the channel as a function of data frequency.

Further, inverse channel filtering action, designed in accordance with the frequency and signal-perturbing analysis of a recording system, is important to producing the desired raised cosine output signal characteristics. Ideally, for cost-reduction purposes and in a practical system, all of the filtering actions and equalizing functions could be combined in a single filter in a readback system. It is apparent that these latter-mentioned filter actions are necessary for truly obtaining an output signal exhibiting raised cosine characteristics.

Another consideration in magnetic recording systems is the effect of frequency variations on the equalization. If, ina in a digital magnetic recording system, frequency variations of ±10 percent are to be expected, with this variation and the filtering actions not tracking the velocity or frequency variations of the readback signal, there is some degradation of the equalization. However, it has been observed that the degradation at frequencies of interest, for example, 50,000 flux changes per inch with a media velocity of 50 inches per second, did not degrade the equalization to a point where the digital signal cannot be recovered. In particular applications, it may be desirable to frequency track equalization with the velocity variations of the recording system.

All of the above-described equalization and filtering as mentioned earlier have a pulse-slimming effect. However, the advantage of pulse slimming per se does not necessarily contribute to the fidelity of detection. It is the adjustment of the zero crossovers, particularly of the secondary lobes or tails, as shown in FIG. 2, that is, the important aspect of the invention.

The invention may be practiced using any known filter design and adjusting same to obtain the stated raised cosine equalization. Known filter design approaches may be used. A first step is always to analyze the recording channel including data signal characteristics. Then, the raised cosine characteristics are added to the analysis. Detailed design then follows.

Figure 5:
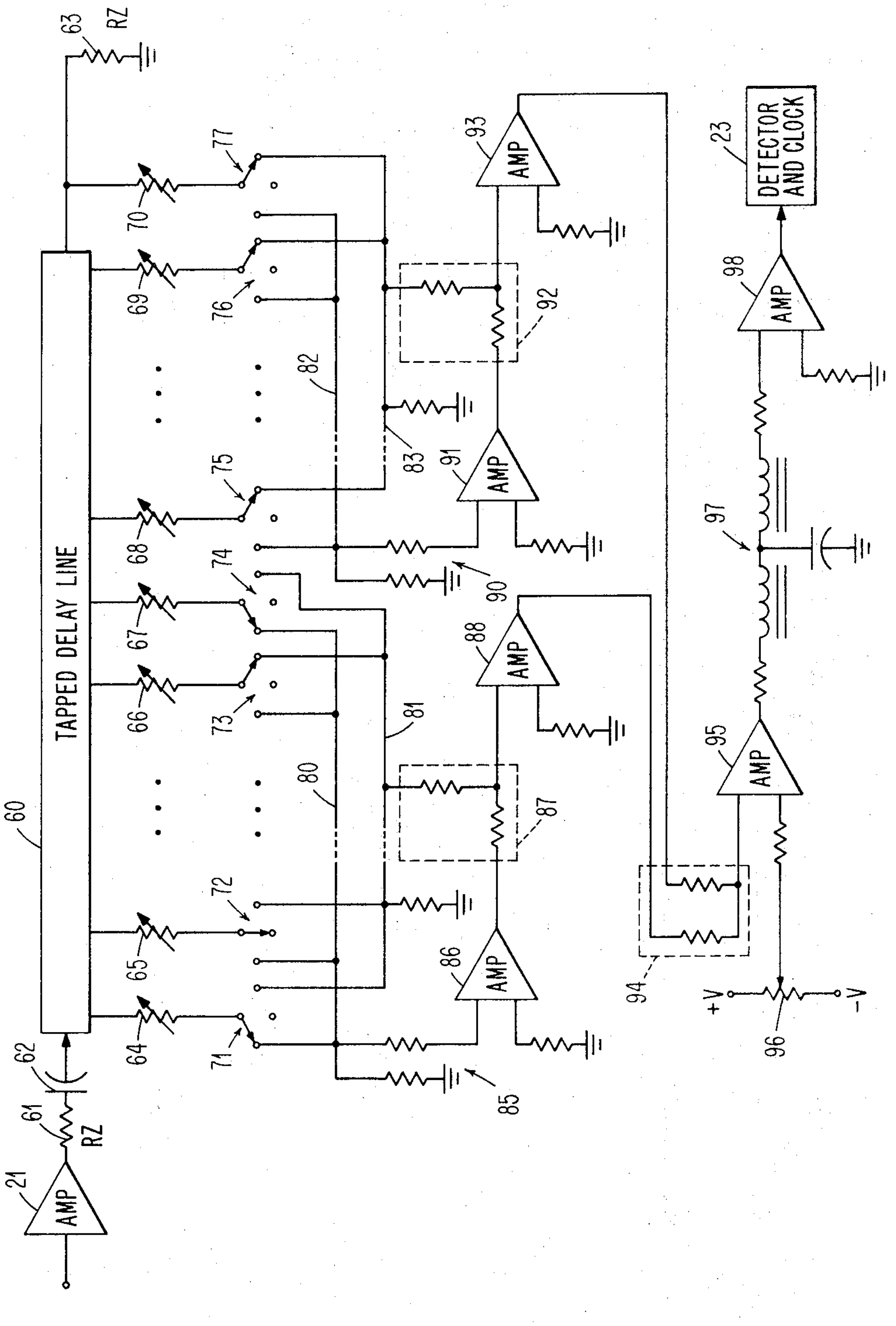
FIG. 5 is a simplified schematic block diagram of a known filter design used in a constructed embodiment to illustrate operation of the invention with known filter apparatus.

FIG. 5 illustrates a tapped delay line filter system usable as filter 22 of the FIG. 1 illustrated embodiment. When using this particular design, filter 11 may be dispensed with. In the alternative, a filter such as shown in FIG. 5 may be used for both filters 11 and 22; i.e., two of the FIG. 5 illustrated filters may be used. The illustrated filter is primarily useful for determining how to obtain the raised cosine equalized output signal. In a commercial embodiment, it is preferable to have an active filter and adjust it in accordance with the measurements made using the FIG. 5 illustrated embodiment.

Amplifier 21 amplifies the received signal to a level to compensate for any signal losses in tapped signal delay line 60 and the connecting circuitry to the operational amplifiers 86, 88, 95, and 98. The readback signal passes through termination resistor 61 having an electrical impedance equal to the characteristic impedance of line 60. Capacitor 62 ensures that only the AC portion of the readback signal is coupled to the input of line 60. Line 60 has a large plurality of taps extending along its length for taking signal portions off as the signals pass down the line. The signals from each of the respective taps are passed through a respective variable resistor 64–70, inclusive, plus others represented by the ellipses between resistors 65 and 66 and between 68 and 69. Each of the variable resistors are connected to one of the three-way switches 71–77, inclusive. For example, there may be a total of forty taps divided into two sections of twenty taps each. Switches 71–74 selectively connect the respective variable resistances to a first current summing node 80 for application through resistance network 85 to operational amplifier 86. The amplified signal is supplied through current summing network 87 to be combined with signals passed by the switches 71–74 to second current summing node 81. Amplifier 88 amplifies the current summed signals from the first section of delay line taps. To obtain various filtered signal waveforms supplied from amplifier 88, the switches 71–74 may be set either to the OFF position, which is the center terminal of the respective switches, to the first position for current summing node 80 or the third position for current summing node 81.

In a similar manner, the second section of taps is connected respectively through variable resistors 68–70 and thence three-way switches 75–77 to third current summing node 82 or fourth current summing node 83 in the same manner as described for nodes 80 and 81. The summed currents from node 82 are supplied through resistive network 90 to third operational amplifier 91. The amplified signal is then supplied through current summer 92 which combines the signals from nodes 82 and 83 as an input signal to operational amplifier 93. The output signals of amplifier 88 and 93 are, in turn, current summed by network 94. Operational amplifier 95 has a threshold which is adjustable by resistive network 96 for ensuring a proper AC signal for detector and clock 23. High-frequency noise is substantially eliminated by low-pass filter 97, with the output signals being supplied to detector and clock 23 by operational amplifier 98.

The operation of the above-described equalizer may be explained by considering it as a waveform generator. If the input to the generator, i.e., tapped delay line 60, is an impulse filtered to a 1.2 megahertz bandwidth, for example, the resulting waveform would be a sine X/X. For example, many of such signals can be summed together from the various taps at predetermined time intervals with the peak signals set to any desired value by the respective variable resistors independent of each and every other signal from the respective taps. The increments of delay between the parallel resistances and summing amplifiers provide for level control and precise current summation. In effect, the equalizer is a 40-point waveform generator adjustable to generate a precise raised cosine equalization. Frequency response, both as to amplitude and phase, corresponds to that of the input waveform.

As is well known, to adjust such an equalizer, one must first determine the waveform corresponding to the desired equalizer frequency response, i.e., the raised cosine response for the bandwidth under consideration. Then, with a rectangular pulse input, the equalizer is adjusted to create this waveform.

The summing resistors should be chosen to be sufficiently low in impedance so as to not seriously load the parallel resistance of the potentiometers and the other fixed resistor networks. The resistors can also be varied in impedance to compensate for the known signal losses of the tapped delay line 60. These losses can be measured if they are not originally known. It is preferred that the variable resistors have a maximum impedance of approximately ten times that of the line 60 characteristic impedance.

The operational amplifiers 86, 88, 95, and 98 can be those well-known, monolithic, operational amplifiers which have a relatively wide band and good linear-gain characteristics. Each of the variable resistors and switches illustrated in FIG. 5 can be controlled from a panel (not shown) which mounts the tapped delay line.

While the invention has been particularly shown and described with reference to a preferred embodiment thereof, it will be understood by those skilled in the art that various changes in form and details may be made therein without departing from the spirit and scope of the invention.

What is claimed is:

1. For a digital recording system using a linearized record of digital signals having bit periods of predetermined duration, an improved readback system, including the combination:

a twice Nyquist bandwidth circuit for transferring readback signals therethrough from said linearized record; and filter means electrically associated with said circuit to adjust zero crossovers of said read-back signals in accordance with a raised cosine $\alpha=1$ function of said readback signals.

2. The system set forth in claim 1 further including a zero-crossover detection system receiving said readback signals from said circuit and responsive thereto for detecting digital signals therein in a self-clocking manner.

3. The system set forth in claim 2 wherein said filter means in said readback circuit only partially generates said raised cosine function and being adapted to compensate readback signals read from a linearized record having a partial raised cosine filtering effected thereon prior to or during generation of the record such that the two partial compensations result in an effective raised cosine function on said readback signals.

4. The system set forth in claim 2 further including additional filters for providing compensation other than said raised cosine filter in addition to said raised cosine filter means.

5. The system set forth in claim 4 wherein said additional filtering action includes an inverse sinc or whitening filter action means.

6. The system set forth in claim 4 wherein said additional filtering means is an inverse channel filter.

7. The system set forth in claim 6 further including inverse sinc filter means.

8. The system set forth in claim 2 wherein said raised cosine filter means is only partially in said readback means with the remainder being in a recording system for use to generate said linearized record whereby the effective raised cosine filtering action is the result of combining the prewrite compensation with the readback compensation.

9. The system set forth in claim 1 wherein said filter means establishes said raised cosine output signal to have one-half peak amplitude at approximately one-half of a bit period of said readback signal.

10. A readback system for a digital signal magnetic recording system with signal-processing means having filter action exhibiting raised cosine $\alpha=1$ characteristics for improving detectability of read-back signals in said system.

11. The system set forth in claim 10 further including a self-clocking, zero-crossover detector receiving said readback signals from said filter means and including means generating a clock signal derived from the raised cosine compensated filter.

12. The system set forth in claim 10 wherein said signal-processing means further exhibits additional filter action for compensating said readback signals in addition to said raised cosine filtering action thereby adjusting zero crossovers more closely to a given constant periodicity and establishing a one-half peak amplitude at a one-half bit period of said readback signal.

13. Zero-crossing adjustment for a periodic signal being processed in a digital magnetic recording system having certain signal perturbing characteristics, including the steps of:

adjusting such signals in accordance with the inverse of the magnetic recording system signal perturbing characteristics and effecting a raised cosine $\alpha=1$ filtering action on said signal.

14. The adjustment set forth in claim 13 and further applying an inverse sinc or whitening filter action to said signal.

15. The adjustment set forth in claim 12 further including linearizing the recording of signals on a magnetic record.

16. The adjustment set forth in claim 15 including detecting the filtered signals using zero-crossover detection techniques.

17. A digital magnetic recording system including means for receiving data signals to be recorded, prewrite compensation means partially compensating signals to be recorded in an analog manner in accordance with raised cosine characteristics, bias means receiving the partially filtered signals for adding a bias signal thereto, record signal amplifier means receiving the biased signals to be recorded and means for recording the biased signals on a magnetic media, means for detecting recorded signals and amplifying same, readback filter means receiving the amplified readback signals and adjusting the signals for zero crossover in a manner complementary to the prewrite compensation such that the output signal from said readback filter means has compensated the signals being processed in accordance with raised cosine characteristics, and detector means receiving the signals from said readback filter means for detecting same and indicating the digital representation of the readback recorded signal.

18. The record system set forth in claim 17 further including additional filtering action in said filter in accordance with recording channel characteristics.

19. The system set forth in claim 17 wherein said prewrite compensation compensates a signal in other than said raised cosine characteristics and said raised cosine characteristics filtering action is entirely provided by said readback filter.

* * * * *